(12) United States Patent
Carpentier et al.

(10) Patent No.: US 9,748,821 B2
(45) Date of Patent: Aug. 29, 2017

(54) MODULAR COOLING ARRANGEMENT FOR ELECTRIC MACHINE

(71) Applicant: TM4 INC., Boucherville (CA)

(72) Inventors: Bruno Carpentier, St-Basile-le-Grand (CA); Benjamin Martineau, Boucherville (CA)

(73) Assignee: TM4 INC., Boucherville (CA)

( * ) Notice: Subject to any disclaimer, the term of this patent is extended or adjusted under 35 U.S.C. 154(b) by 287 days.

(21) Appl. No.: 14/376,669

(22) PCT Filed: Feb. 19, 2013

(86) PCT No.: PCT/CA2013/000146
§ 371 (c)(1),
(2) Date: Aug. 5, 2014

(87) PCT Pub. No.: WO2013/123575
PCT Pub. Date: Aug. 29, 2013

(65) Prior Publication Data
US 2015/0028728 A1    Jan. 29, 2015

Related U.S. Application Data

(60) Provisional application No. 61/600,781, filed on Feb. 20, 2012.

(51) Int. Cl.
*H02K 9/22* (2006.01)
*H02K 9/19* (2006.01)

(52) U.S. Cl.
CPC ............... *H02K 9/22* (2013.01); *H02K 9/19* (2013.01); *H02K 2209/00* (2013.01); *H02K 2213/12* (2013.01)

(58) Field of Classification Search
CPC .. H02K 9/00; H02K 1/20; H02K 3/24; H02K 9/005; H02K 9/19; H02K 21/222; H02K 1/185; H02K 1/148
USPC ....................................... 310/52, 58, 59, 60 A
See application file for complete search history.

(56) References Cited

U.S. PATENT DOCUMENTS

| | | | |
|---|---|---|---|
| 6,960,851 B2 * | 11/2005 | Poulin | H02K 9/19 310/52 |
| 7,105,959 B2 * | 9/2006 | Yamamoto | H02K 5/20 310/52 |
| 8,354,763 B2 * | 1/2013 | Hashiba | H02K 1/20 310/54 |
| 2004/0012272 A1 | 1/2004 | Houle et al. | |
| 2005/0116553 A1 | 6/2005 | Poulin et al. | |
| 2009/0026858 A1 * | 1/2009 | Knauff | H02K 1/20 310/59 |
| 2009/0115268 A1 * | 5/2009 | Fleming | H02K 9/22 310/52 |

(Continued)

OTHER PUBLICATIONS

International Search Report and Written Opinion under date of mailing of May 23, 2013 in connection with PCT/CA2013/000146.

*Primary Examiner* — Joshua Benitez-Rosario
*Assistant Examiner* — Leda Pham
(74) *Attorney, Agent, or Firm* — Quarles and Brady, LLP; Terri Flynn

(57) ABSTRACT

A cooling arrangement for electric machines where cooling plates are maintained against the inner surface of the stator and are interconnected by a cooling tube that carries the stator generated heat outside of the machine.

14 Claims, 13 Drawing Sheets

(56) References Cited

U.S. PATENT DOCUMENTS

2011/0278968 A1* 11/2011 Houle ................... H02K 1/20
310/54

* cited by examiner

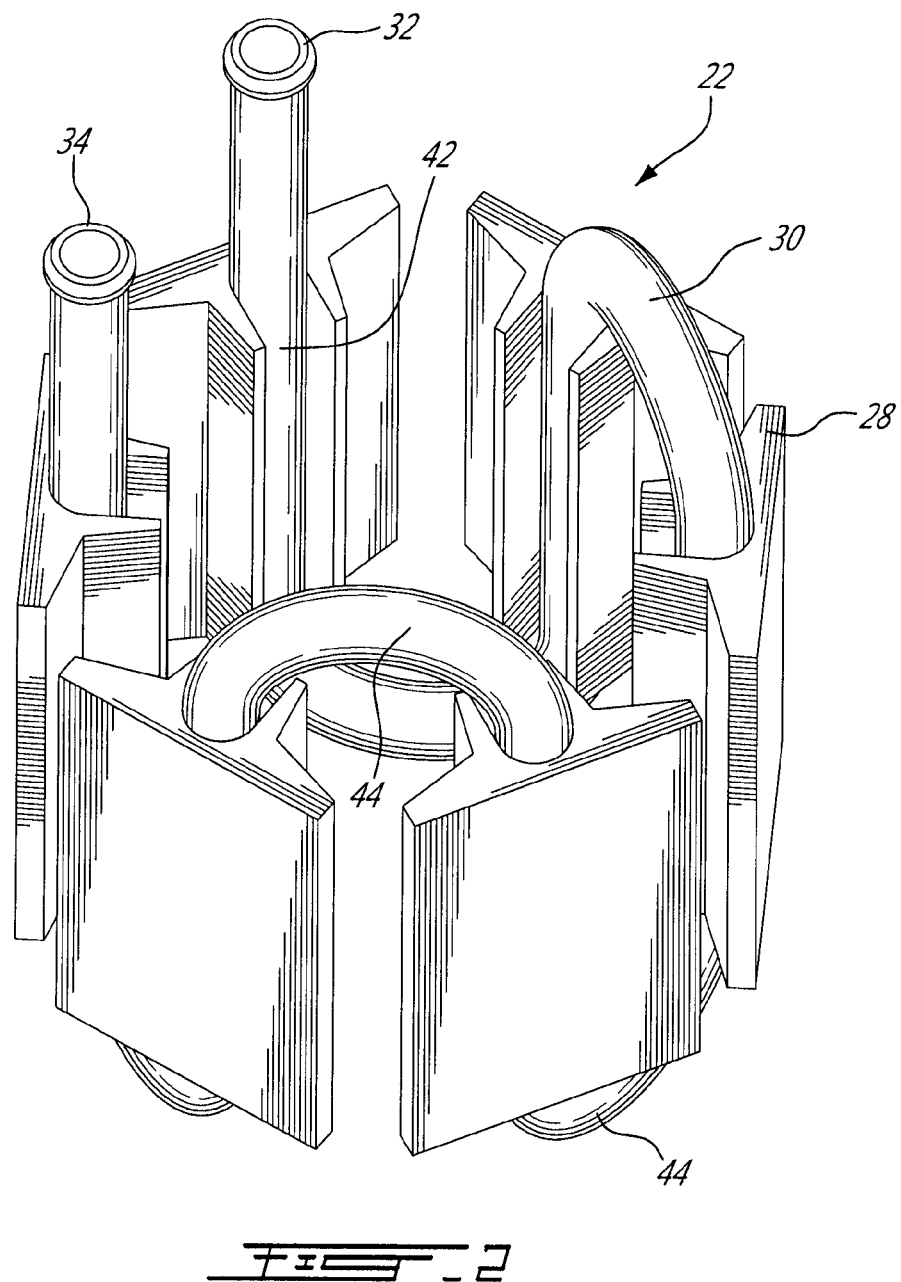

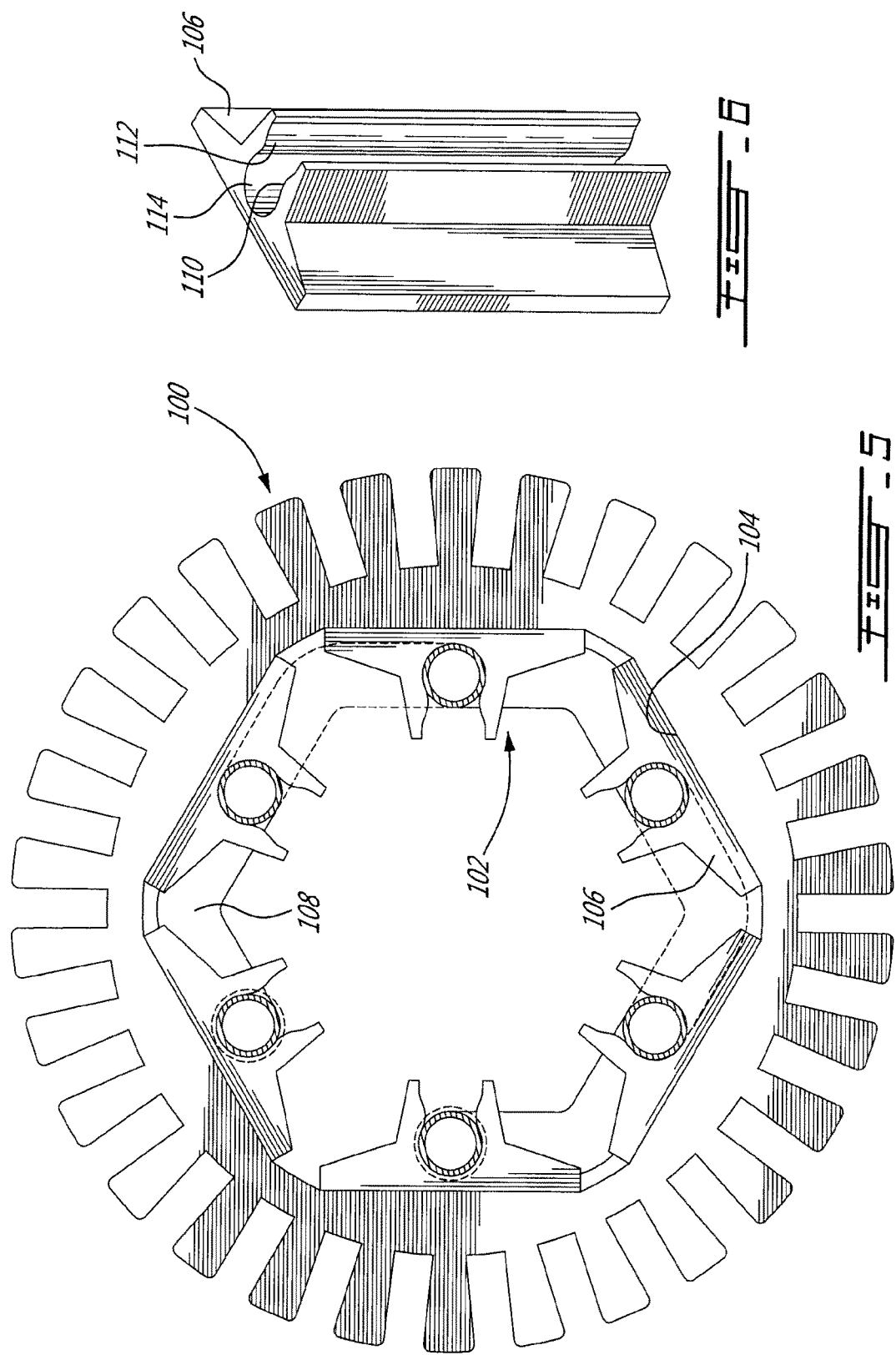

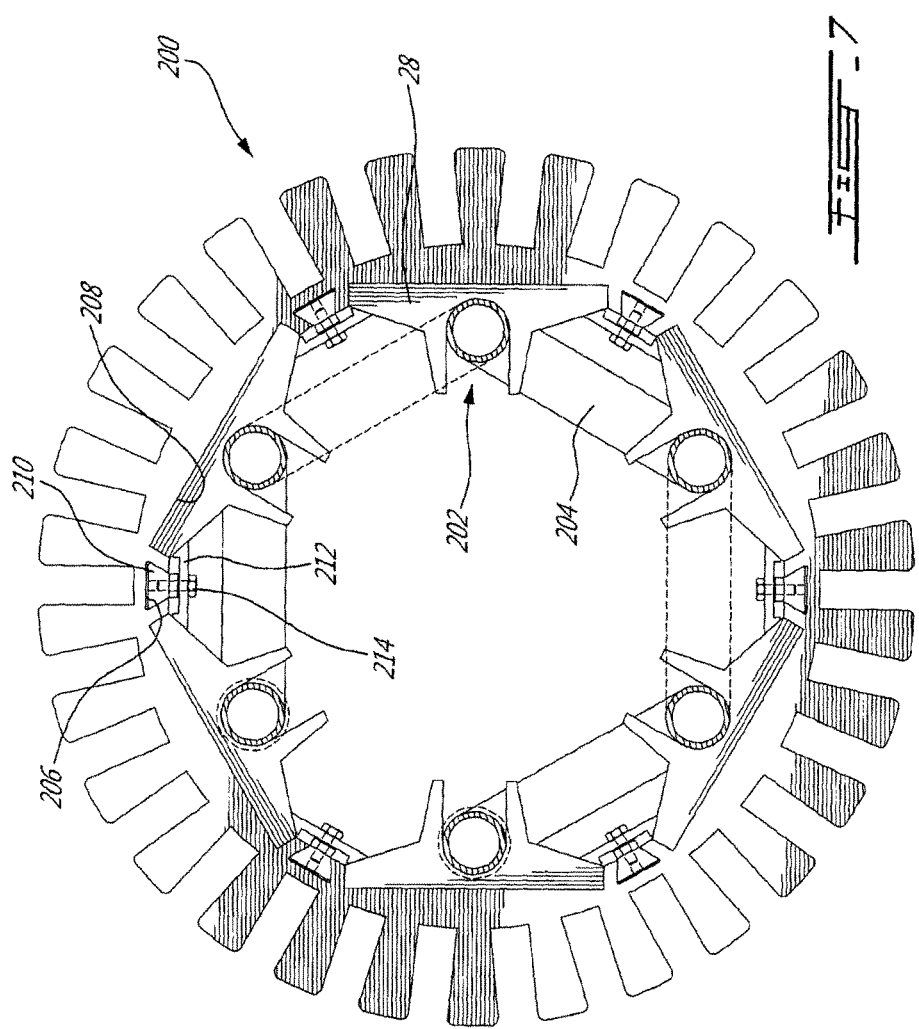

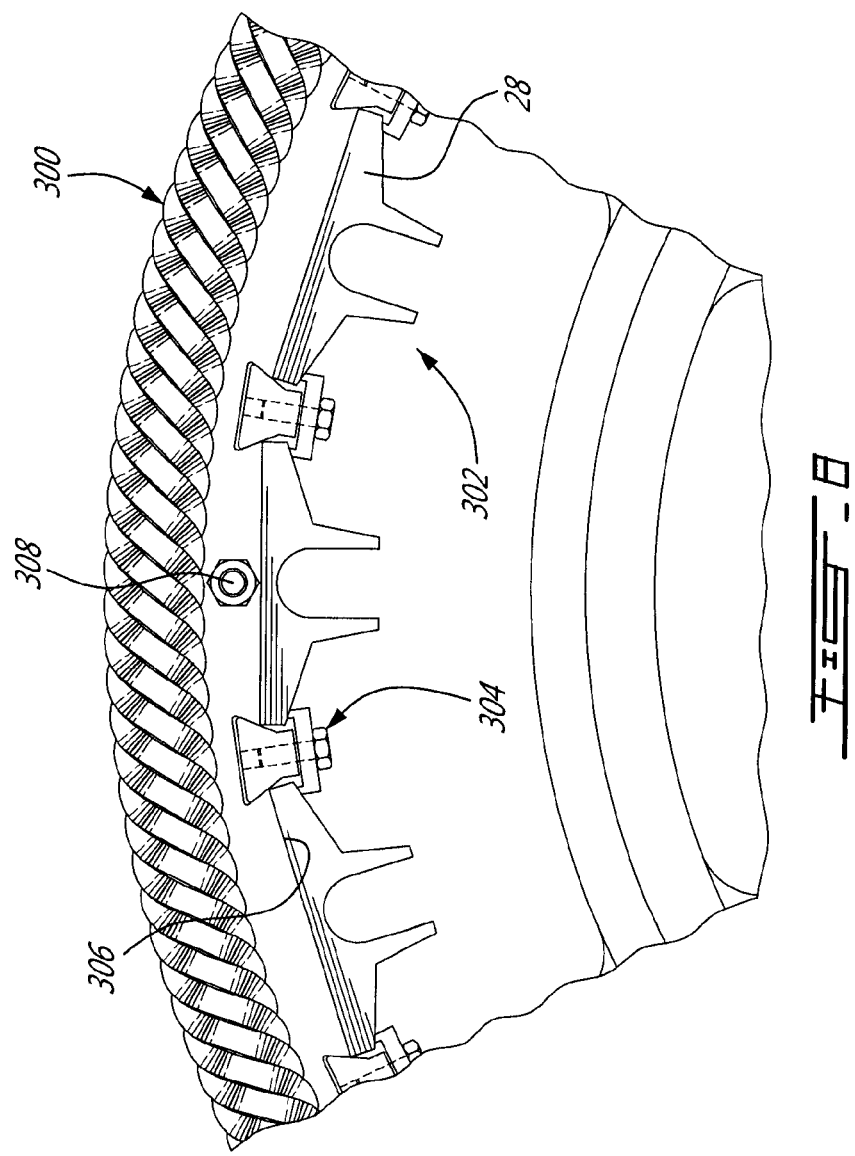

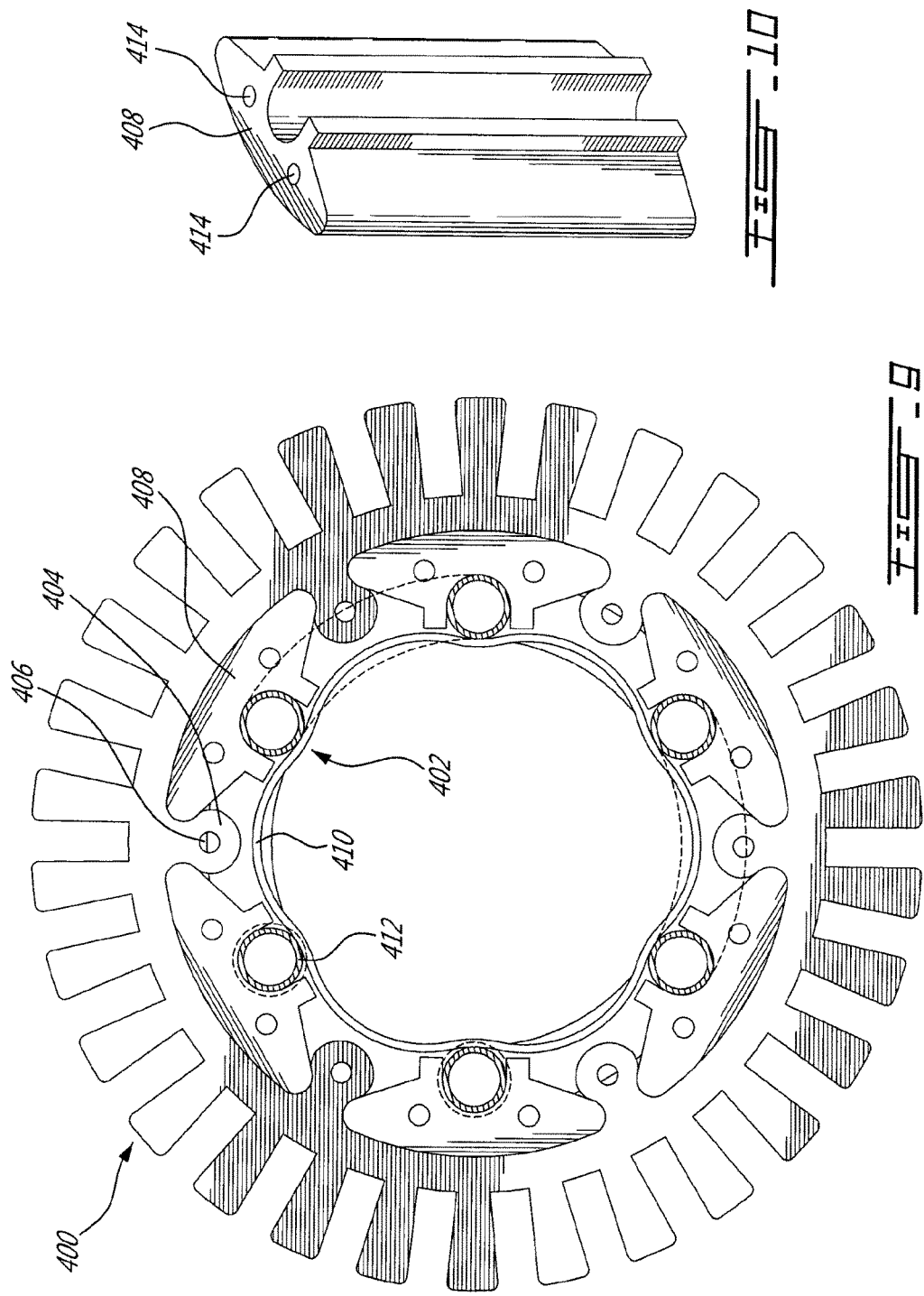

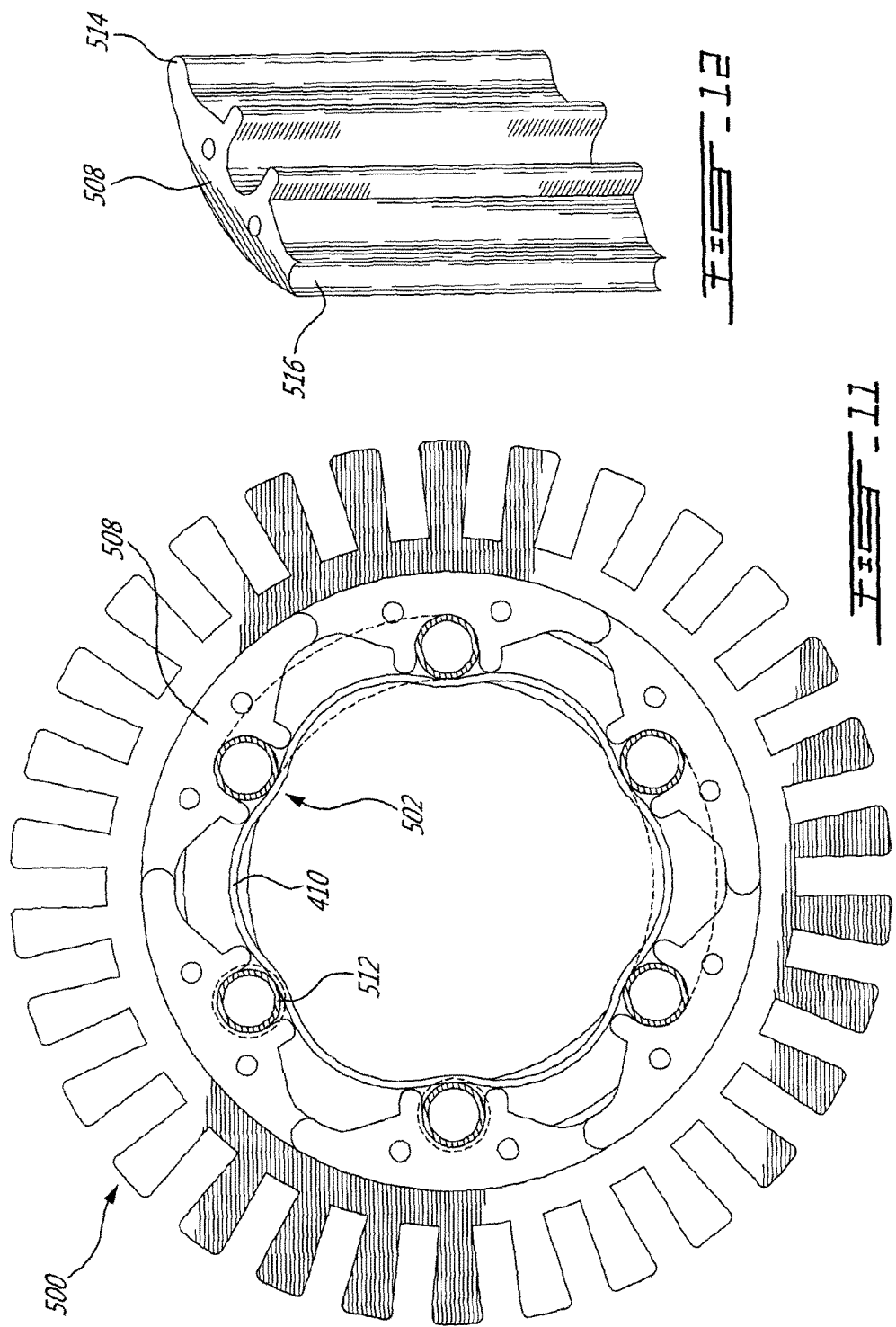

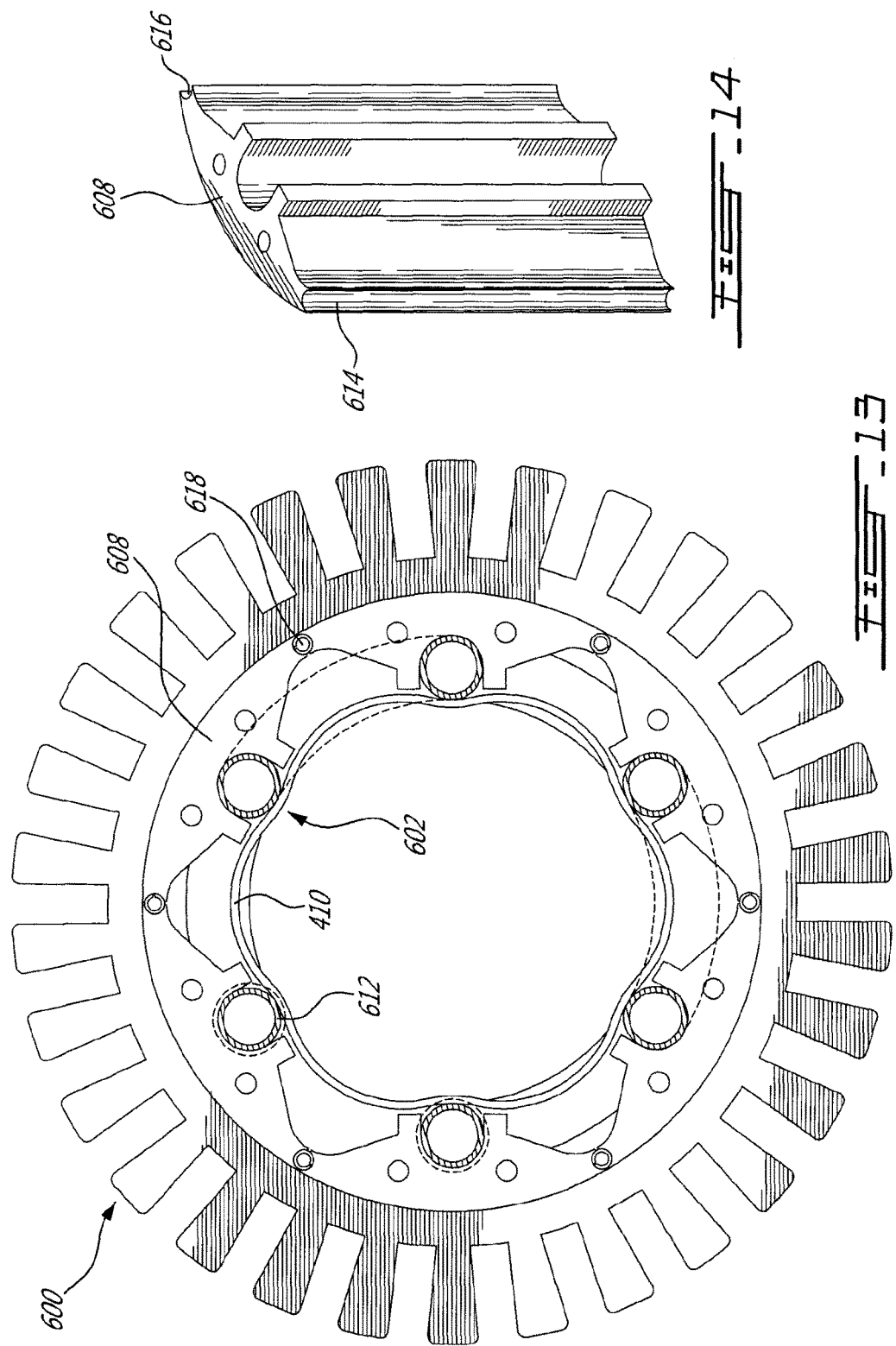

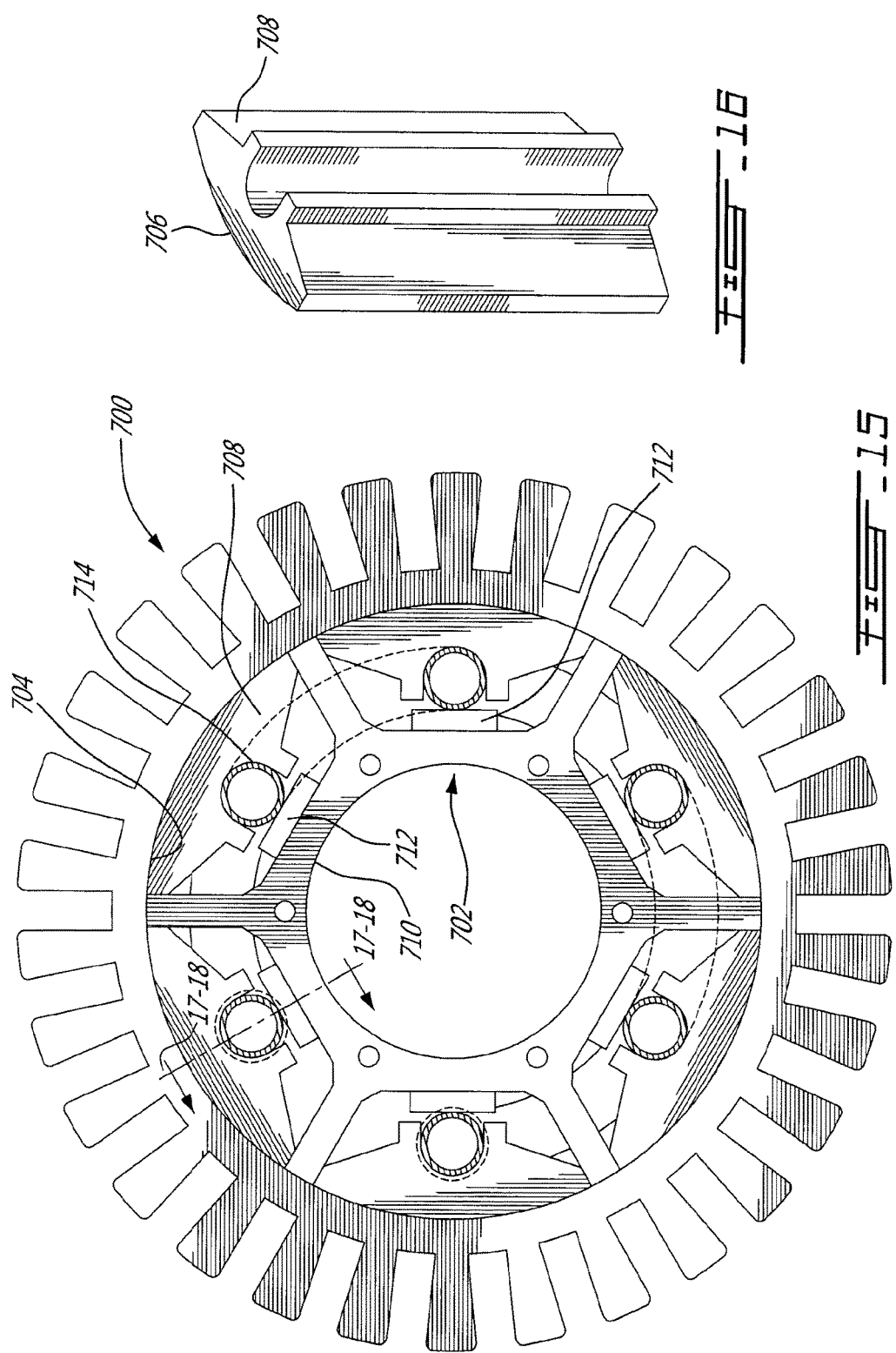

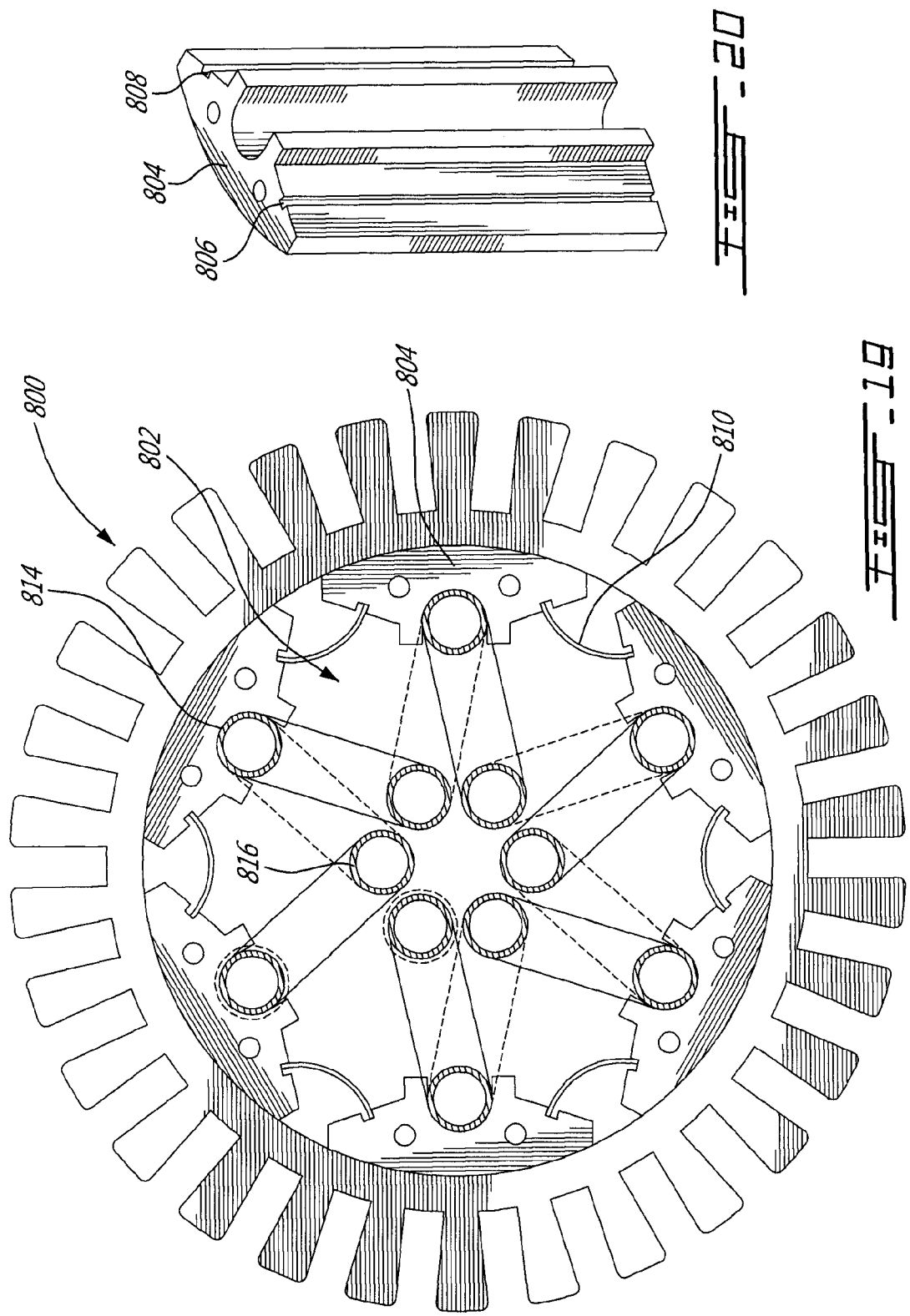

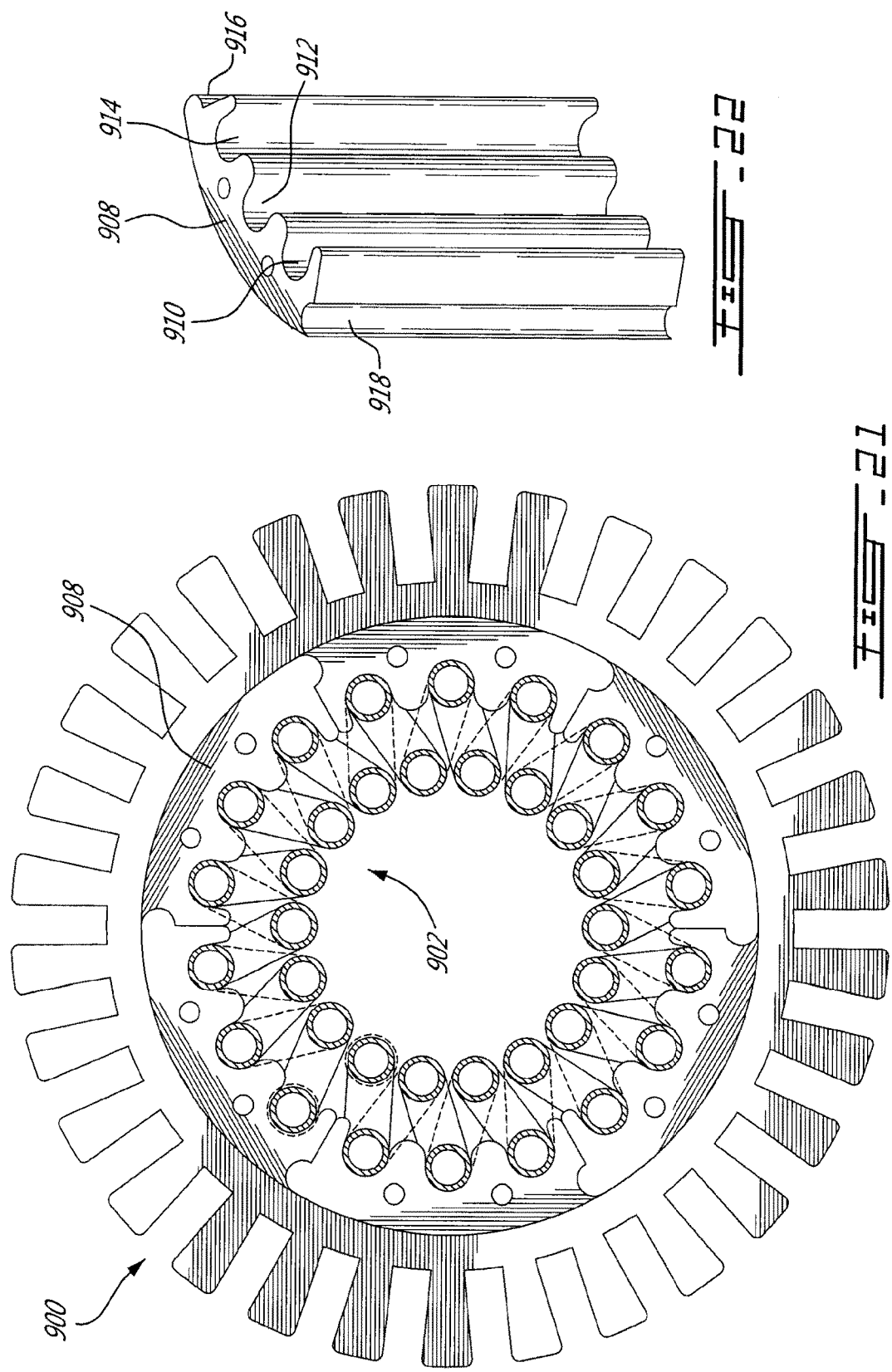

MODULAR COOLING ARRANGEMENT FOR ELECTRIC MACHINE

CROSS-REFERENCE TO RELATED APPLICATIONS

This application represents the national stage entry of PCT International Application No. PCT/CA2013/000146 filed Feb. 19, 2013, which claims the benefit of U.S. Provisional Patent Application No. 61/600,781 filed Feb. 20, 2012, the disclosures of which are hereby incorporated by reference in their entirety for all purposes.

FIELD

The present disclosure relates to electric machines. More specifically, the present disclosure is concerned with modular cooling arrangements for electric machines.

BACKGROUND

Electric machines, motors and/or generators, are well known in the art. It is also widely known that electric machines generate heat as a by-product and that this heat must be somehow extracted from the machine to improve the performance and/or to prevent early degradation thereof.

Electric machines are often air-cooled. This is easily done by providing apertures in the body of the machine and forcing air therethrough. The efficiency of such a cooling arrangement is poor since air is a generally low efficiency cooling fluid. Furthermore, some electric machines operate in environments that are such that it is not possible to provide apertures to allow air therein. Accordingly, fluid cooling arrangements for electric machines have also been designed.

Some permanent magnet electric machines are provided with an internal stator and an external rotor generally enclosing the stator. When this is the case, the stator has a generally cylindrical body and coils are so mounted to the cylindrical body as to outwardly produce a magnetic field that interacts with the externally provided rotor. Since the heat is generally generated in the stator that is somewhat enclosed by the rotor, it may be difficult to install a fluid cooling arrangement inside an enclosed stator of such an external rotor electric machine.

BRIEF DESCRIPTION OF THE DRAWINGS

In the appended drawing:

FIG. 2 is a perspective view of the cooling arrangement of FIG. 1;

FIG. 5 is a top plan view illustrating a stator provided with a cooling arrangement according to a second illustrative embodiment;

FIG. 6 is a perspective view of a cooling plate as used in the cooling arrangement of FIG. 5;

FIG. 7 is a top plan view illustrating a stator provided with a cooling arrangement according to a third illustrative embodiment;

FIG. 8 is a sectional top plan view illustrating a stator provided with a cooling arrangement according to a fourth illustrative embodiment;

FIG. 9 is a top plan view illustrating a stator provided with a cooling arrangement according to a fifth illustrative embodiment;

FIG. 10 is a perspective view of a cooling plate as used in the cooling arrangement of FIG. 9;

FIG. 11 is a top plan view illustrating a stator provided with a cooling arrangement according to a sixth illustrative embodiment;

FIG. 12 is a perspective view of a cooling plate as used in the cooling arrangement of FIG. 11;

FIG. 13 is a top plan view illustrating a stator provided with a cooling arrangement according to a seventh illustrative embodiment;

FIG. 14 is a perspective view of a cooling plate as used in the cooling arrangement of FIG. 13;

FIG. 15 is a top plan view illustrating a stator provided with a cooling arrangement according to a eighth illustrative embodiment;

FIG. 16 is a perspective view of a cooling plate as used in the cooling arrangement of FIG. 15;

FIG. 19 is a top plan view illustrating a stator provided with a cooling arrangement according to a ninth illustrative embodiment; and FIG. 20 is a perspective view of a cooling plate as used in the cooling arrangement of FIG. 19;

FIG. 21 is a top plan view illustrating a stator provided with a cooling arrangement according to a tenth illustrative embodiment; and FIG. 22 is a perspective view of a cooling plate as used in the cooling arrangement of FIG. 20.

DETAILED DESCRIPTION

Figure 1:
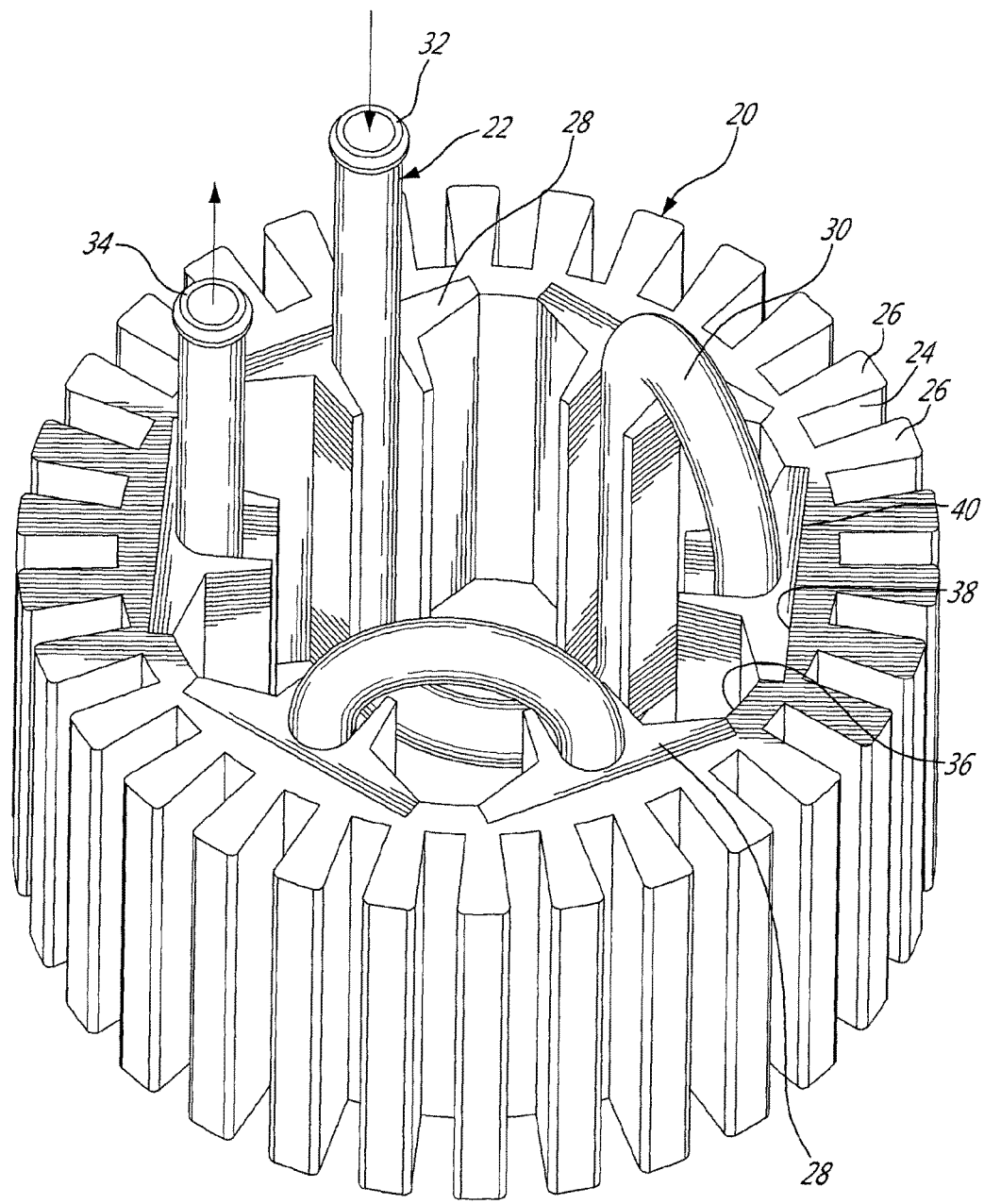
FIG. 1 is a perspective view of a stator provided with a cooling arrangement according to a first illustrative embodiment.

According to an illustrative embodiment, there is provided a cooling arrangement for the hollow internal stator of an electric machine, the stator including an internal surface, the cooling arrangement comprising:

at least two cooling plates provided with a contact surface so configured as to be applied to the internal surface of the stator and with a tube receiving channel;

a cooling tube configured and sized as to be inserted in the tube receiving channel of the at least two cooling plates;

wherein the cooling tube includes an inlet and an outlet allowing cooling fluid therein to thereby cool the stator.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "rear", "upwardly", "downwardly", etc. is used. It is to be understood that such terminology is used for ease of description and in a relative sense only and is not to be taken in any way as a limitation upon the scope of the present disclosure.

Other objects, advantages and features of the modular cooling arrangement for electric machine will become more apparent upon reading of the following non-restrictive description of illustrative embodiments thereof, given by way of example only with reference to the accompanying drawings.

Generally stated, illustrative embodiments described herein are concerned with cooling arrangements for electric machines where cooling plates are maintained against the inner surface of the stator and are interconnected by a serpentine cooling tube that carry the stator generated heat outside of the machine.

Turning now to FIGS. 1 to 4 of the appended drawings, a stator 20 provided with a cooling arrangement 22 according to a first illustrative embodiment will be described.

The stator 20 is conventionally made of a plurality of stacked laminations provided with coil receiving slots 24 defined by projecting teeth 26 therebetween. In some instances, prewound coils (not shown), for example made of rectangular wires, inserted in these coil-receiving slots. These prewound coils include two generally longitudinal legs to be inserted in the slots and two generally curved heads that interconnect and are integral with the longitudinal legs. Of course, other types of coils can be used.

The cooling arrangement 22 includes 6 cooling plates 28 interconnected by a continuous serpentine cooling tube 30 provided with an inlet 32 and an outlet 34.

It is to be noted that the stator 20 has an inner surface 36 provided with cut-out portions 38 that allow a contact portion 40 of the cooling plates 28 to be snugly received therein. Of course, heat transmitting paste and/or adhesive may be provided between the plates 28 and all or some of the cut-out portions 38 of the stator 20.

The cooling arrangement 22 is better seen in FIG. 2, where it is shown without the stator 20. FIG. 2 shows that the continuous serpentine cooling tube includes straight portions 42 intended to be mounted to the cooling plates 28 and interconnected by curved portions 44.

Figure 3:
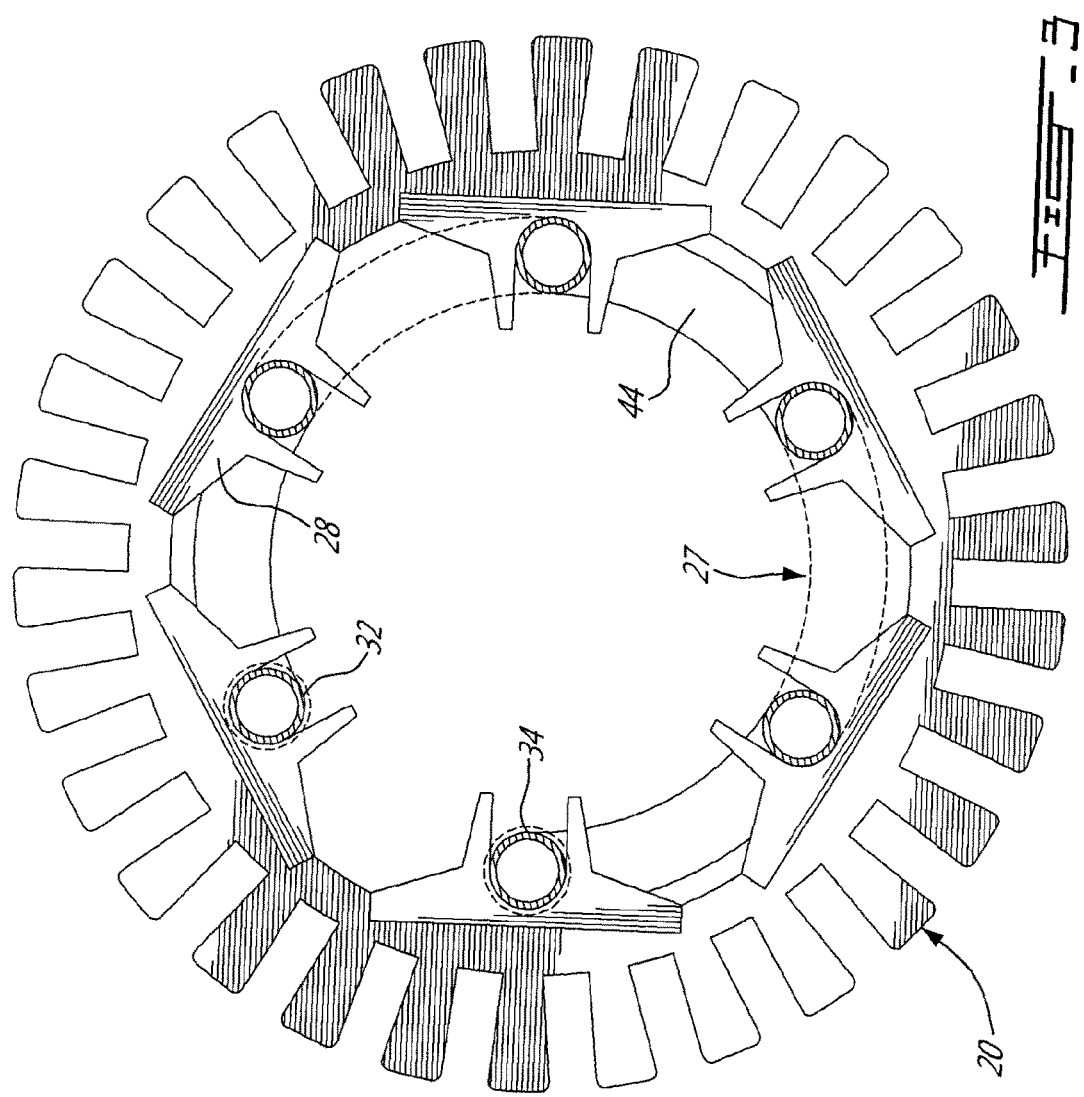
FIG. 3 is a top plan view of the stator of FIG. 1.

FIG. 3 shows a top view of the stator 20 with the cooling arrangement 22, illustrating the curvature of the curved portions 44.

Figure 4:
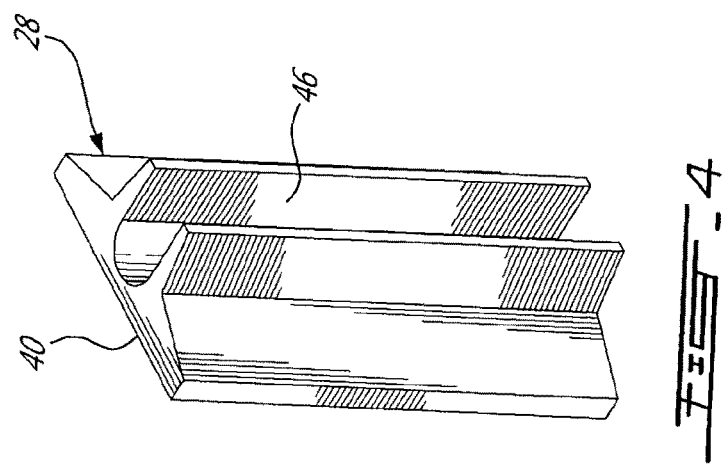
FIG. 4 is a perspective view of a cooling plate as used in the cooling arrangement of FIG. 2.

As can be better seen from FIG. 4, each cooling plate 28 includes a contact portion 40 and an integral tube receiving channel 46 which is generally U-shaped and sized according to the diameter of the continuous serpentine cooling tube 30 used. The continuous serpentine cooling tube 30 is secured to the receiving channel 46 via an adequate heat transfer adhesive, by brazing or by welding, for example.

Turning now to FIGS. 5 and 6 of the appended drawings, a stator 100 provided with a cooling arrangement 102 according to a second illustrative embodiment will be described. It is to be noted that since the cooling arrangement 102 is similar to the cooling arrangement 22 described hereinabove, only the differences therebetween will be described hereinbelow.

As can be seen from FIG. 5, the stator 100 is not provided with cut-out portions but with flat portions 104 receiving the cooling plates 106. The shape of the cooling tube 108 is also different since it provides a maximized central opening of the stator.

FIG. 6 illustrates the cooling plate 106, which is very similar to the cooling plate 28 but is provided with two internal longitudinal projections 110, 112 that are configured and sized as to help maintain the cooling tube in position in the receiving channel 114.

Turning now to FIG. 7 of the appended drawings, a stator 200 provided with a cooling arrangement 202 according to a third illustrative embodiment will be described. It is to be noted that since the cooling arrangement 202 is similar to the cooling assemblies 22 and 102, only the differences therebetween will be described hereinbelow.

The cooling tube 204 has straight portions between the cooling plates 28, which are identical to those of FIGS. 1 to 4.

The stator 200 also includes dovetail keyways 206 between the cut-out portions 208 and dovetail key arrangements including a dovetail key 210 to be inserted in the keyway 206, a pressure applying longitudinal plate 212 and bolts 214 (one shown) to mount the plate 212 to the key 210 to thereby bias the cooling plates 28 towards the internal surface of the stator.

Turning now to FIG. 8 of the appended drawings, a stator 300 provided with a cooling arrangement 302 according to a fourth illustrative embodiment will be described. It is to be noted that since the cooling arrangement 302 is similar to the cooling assemblies 22, 102 and 202, only the differences therebetween will be described hereinbelow.

It is also to be noted that the continuous serpentine cooling tube is not shown in FIG. 8 for clarity.

The stator 300 has a larger diameter than the previously discussed stators. A dovetail key and keyway arrangement 304 is shown. This arrangement 304 is used as a pressure applying arrangement to bias adjacent cooling plates 27 towards the internal surface of the stator. It is to be noted however that the stator 300 does not include cutouts for the cooling plates 28 but flat portions 306 to receive them. Finally, the stator 300 is provided with bolts 308 (only one shown) to mount the stator to the casing (not shown).

Turning now to FIGS. 9 and 10 of the appended drawings, a stator 400 provided with a cooling arrangement 402 according to a fifth illustrative embodiment will be described. It is to be noted that since the cooling arrangement 402 is similar to the cooling assemblies 22, 102, 202 and 302, only the differences therebetween will be described hereinbelow.

Unlike the previously describes stators, the stator 400 is not provided with cut-out portions or flat portions, but with internal projections 404 each provided with an aperture 406 allowing a fastener (not shown) to mount the stator 400 to a machine casing (also not shown).

The cooling plates 408 are so shaped as to fit between two projections 404 and include apertures 414 allowing fasteners (not shown) to mount the cooling plates 408 to a machine casing (also not shown).

A pressure applying deformable cylindrical element 410 is so configured and sized as to apply pressure on the straight portions of the cooling tube 412 to thereby bias the cooling tube 412 in the tube receiving channel of the cooling plate 408. The element 410 may be made, for example, of steel, spring steel or stainless steel. This pressure applying element 410 help to maintain the cooling tube 412 inside the tube receiving channel of the cooling plate 408 and help maintain an adequate contact between the cooling plates 408 and the internal surface of the stator 400. The pressure applying elements 410 may thus be viewed as a biasing element.

It is to be noted that the pressure applying element 410 and the cooling plates 408 could be designed so that pressure is applied onto both the cooling tubes 412 and to the cooling plates 408.

Turning now to FIGS. 11 and 12 of the appended drawings, a stator 500 provided with a cooling arrangement 502 according to a sixth illustrative embodiment will be described. It is to be noted that since the cooling arrangement 502 is similar to the cooling assemblies 22, 102, 202, 302 and 402, only the differences therebetween will be described hereinbelow.

The cooling arrangement 502 includes interconnectable cooling plates 508 provided with a rounded longitudinal projection 514 provided on one lateral side thereof and a mating longitudinal groove 516 provided on the other lateral side thereof. Accordingly, adjacent cooling plates are interconnected.

As mentioned hereinabove with reference to FIGS. 9 and 10, a pressure applying element 410 helps to maintain the cooling tube 512 inside the tube receiving channel of the cooling plates 508 and helps maintain an adequate contact between the cooling plates 508 and the internal surface of the stator 500. It is to be noted that the pressure applying element 410 contacts to the cooling tube 512 and the cooling plates 508, thanks to the rounded walls defining the tube-receiving channel.

Turning now to FIGS. 13 and 14 of the appended drawings, a stator 600 provided with a cooling arrangement 602 according to a seventh illustrative embodiment will be described. It is to be noted that since the cooling arrangement 602 is similar to the cooling assemblies 22, 102, 202, 302, 402 and 502, only the differences therebetween will be described hereinbelow.

The cooling arrangement 602 includes interconnectable cooling plates 608 provided with longitudinal rounded grooves 614, 616 provided on lateral sides thereof. Accordingly, adjacent cooling plates can be interconnected via dowels 618.

One skilled in the art will understand that the dowels 618 can be replaced by rivets, self-tapping screws or spring pins, for example.

As mentioned hereinabove with reference to FIGS. 9 and 10, a pressure applying element 410 helps to maintain the cooling tube 612 inside the tube receiving channel of the cooling plates 608 and helps maintain an adequate contact between the cooling plates 608 and the internal surface of the stator 600.

Turning now to FIGS. 15 to 18 of the appended drawings, a stator 700 provided with a cooling arrangement 702 according to an eighth illustrative embodiment will be described. It is to be noted that since the cooling arrangement 702 is similar to the cooling assemblies 22, 102, 202, 302, 402, 502 and 602, only the differences therebetween will be described hereinbelow.

As can be better seen from FIG. 15, the internal surface 704 of the stator 700 is cylindrical and includes neither cut-outs nor projections. The contacting surface 706 of the cooling plate 708 is therefore semi-cylindrical to adequately contact the stator 700.

Of course, one skilled in the art will understand that a key and keyway feature (not shown) could be added to prevent rotation of the cooling arrangement with respect to the stator.

The cooling arrangement 702 further includes a biasing assembly configured and shaped as to bias the cooling tube towards the cooling tube receiving channel of the cooling plate 708. More specifically, the biasing assembly includes a star shaped, longitudinal element 710 so configured and sized as to be inserted inside the stator 700 and to contact the internal surface 704 thereof and pressure assemblies 712.

Pressure applying assemblies 712 are positioned between the flat faces of the element 710 and the straight portions of the cooling tube 714. These assemblies 712 help maintain the cooling tube 714 inside the tube-receiving channel of the cooling plate 708 and help maintain an adequate contact between the cooling plates 708 and the internal surface 704 of the stator 700.

Figure 17:
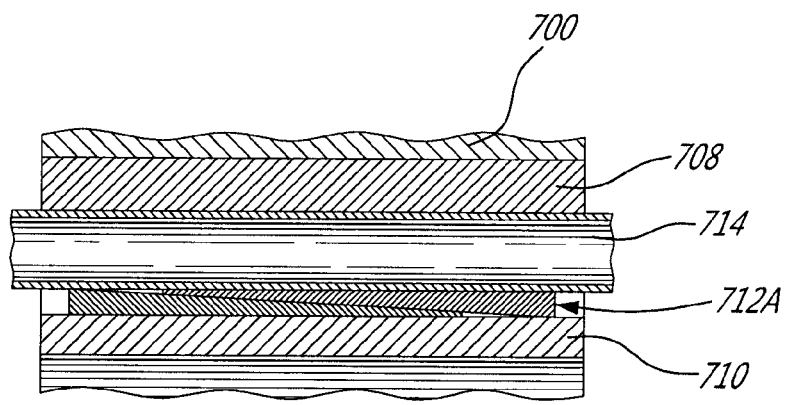
FIG. 17 is a sectional view taken along line 17-17 of FIG. 15.
Figure 18:
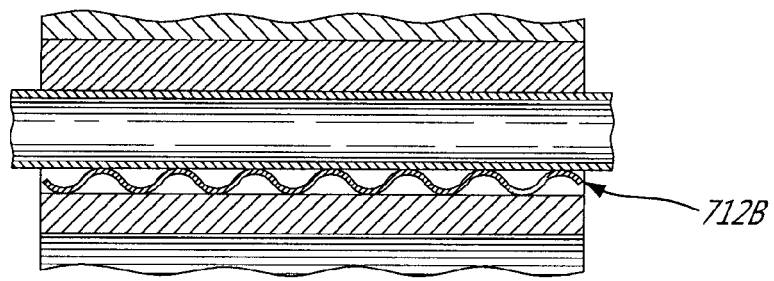
FIG. 18 is an alternate sectional view taken along line 18-18 of FIG. 15.

FIGS. 17 and 18 illustrate two different pressure applying assemblies 712A and 712B, respectively, that may be used as the pressure applying assembly 712 in FIG. 15.

The pressure applying assembly 712A includes two complementary wedges that may be slid onto another to achieve an adequate pressure application.

On the other hand, the pressure applying assembly 712B consists of a waved piece of spring steel that is designed to apply an adequate pressure.

Of course, one skilled in the art will understand that other pressure applying assemblies can be used.

Turning to FIGS. 19 and 20 of the appended drawings, a stator 800 provided with a cooling arrangement 802 according to a ninth illustrative embodiment will be described. It is to be noted that since the cooling arrangement 802 is similar to the cooling assemblies 22, 102, 202, 302, 402, 502, 602 and 702, only the differences therebetween will be described hereinbelow.

The cooling arrangement 802 includes cooling plates 804 provided with two longitudinal slots 806, 808 allowing pieces of spring steel 810 to be used to apply pressure and space the plates 804 onto the internal surface of the stator 800. Of course, other pressure applying mechanisms (not shown) could be used.

The cooling tube 812 includes straight portions 814 that are received in the cooling plates 804 and straight portions 816 that are positioned in the middle of the stator 800. The tubes inside the stator help cooling the entire area inside the hollow stator.

Turning finally to FIGS. 21 and 22 of the appended drawings, a stator 900 provided with a cooling arrangement 902 according to a tenth illustrative embodiment will be described. It is to be noted that since the cooling arrangement 902 is similar to the cooling assemblies 22, 102, 202, 302, 402, 502, 602, 702 and 802, only the differences therebetween will be described hereinbelow.

The cooling arrangement 902 includes interconnectable cooling plates 908 each provided with three longitudinal cooling tube-receiving channels 910, 912 and 914. Therefore allowing more straight portions of cooling tubes to be in contact with the cooling plates 908.

The cooling plates 908 also includes a rounded longitudinal projection 916 provided on one lateral side thereof and a mating longitudinal groove 918 provided on the other lateral side thereof. Accordingly, adjacent cooling plates are interconnected.

It is to be noted that the various features of the illustrative embodiments described hereinabove and illustrated in the appended drawings can be interchanged between embodiments. As a non-limiting example, the two internal longitudinal projections 110, 112 that are configured and sized as to help maintain the cooling tube in position in the receiving channel 114 illustrated in FIGS. 5 and 6 could be used in any of the illustrative embodiments.

One skilled in the art will understand that while a continuous serpentine cooling tube is described herein and illustrated in the appended figures, interconnected tubing elements or other types of suitable flexible hoses could also be used.

Also, one skilled in the art will understand that the cooling plates illustrated and described herein may be fabricated by an extrusion process, for example, and then cut to the correct length. Of course, other fabrication processes may be used.

It is to be understood that the modular cooling arrangement for electric machine is not limited in its application to the details of construction and parts illustrated in the accompanying drawings and described hereinabove. The modular cooling arrangement for electric machine is capable of other embodiments and of being practiced in various ways. It is also to be understood that the phraseology or terminology used herein is for the purpose of description and not limitation. Hence, although the modular cooling arrangement for electric machine has been described hereinabove by way of illustrative embodiments thereof, it can be modified, without departing from the spirit, scope and nature thereof.

What is claimed is:

1. A cooling arrangement for a hollow internal stator of an electric machine, the stator including an internal surface, the cooling arrangement comprising:
    at least two cooling plates each provided with a contact surface so configured as to be applied to the internal surface of the stator and with a generally U-shaped tube receiving channel;
    pressure-applying means configured to bias the at least two cooling plates onto the internal surface of the stator, the pressure-applying means including a dovetail key inserted in a dovetail keyway provided in the internal surface of the stator; a pressure-applying plate being configured to be mounted to the dovetail key to apply pressure onto adjacent cooling plates;
    a cooling tube configured and sized as to be inserted in the tube receiving channel of the at least two cooling plates;
    wherein the cooling tube includes an inlet and an outlet allowing cooling fluid therein to thereby cool the stator.

2. A cooling arrangement as recited in claim 1, wherein the cooling tube is a serpentine cooling tube.

3. A cooling arrangement as recited in claim 1, wherein the internal surface of the stator includes cut-out portions configured and sized to receive the cooling plates.

4. A cooling arrangement as recited in claim 1, wherein the internal surface of the stator includes projections configured and sized to be positioned between adjacent cooling plates.

5. A cooling arrangement as recited in claim 1, further including a biasing assembly to bias the cooling tube in the tube receiving channels.

6. A cooling arrangement as recited in claim 5, wherein the biasing assembly includes a pressure applying deformable cylindrical element so configured and sized as to bias the cooling tube in the tube receiving channels.

7. A cooling arrangement as recited in claim 5, wherein the biasing assembly includes a star shaped, longitudinal element configured and sized as to be inserted inside the stator and to contact the internal surface thereof and pressure applying assemblies so mounted between the star shaped element and the cooling tube as to bias the cooling tube towards the tube receiving channels.

8. A cooling arrangement as recited in claim 7, wherein the pressure applying assemblies are positioned between flat faces of the star shaped element and the cooling tube.

9. A cooling arrangement as recited in claim 7, wherein the pressure applying assemblies each include a double wedge.

10. A cooling arrangement as recited in claim 7, wherein the pressure applying assemblies each includes a waved piece of spring steel.

11. A cooling arrangement as recited in claim 1, wherein each cooling plate includes interlocking elements allowing adjacent cooling plates to be interlocked.

12. A cooling arrangement as recited in claim 11, wherein the interlocking elements are selected from the group consisting of dowels rivets, self tapping screws and spring pins.

13. A cooling arrangement as recited in claim 1, wherein each cooling plate includes more than one cooling tube receiving channel.

14. A cooling arrangement for a hollow internal stator of an electric machine, the stator including an internal surface, the cooling arrangement comprising:
    at least two cooling plates each provided with a contact surface so configured as to be applied to the internal surface of the stator and with a generally U-shaped tube receiving channel; each at least two cooling plates including two longitudinal slots;
    pressure-applying means configured to bias the at least two cooling plates onto the internal surface of the stator, the pressure-applying means including at least one piece of spring steel configured to be so inserted in the longitudinal slots of adjacent cooling plates as to apply pressure onto adjacent cooling plates;
    a cooling tube configured and sized to be inserted in the tube receiving channel of each of the at least two cooling plates;
    wherein the cooling tube includes an inlet and an outlet allowing cooling fluid therein to thereby cool the stator.

* * * * *